United States Patent Office 3,584,027
Patented June 8, 1971

---

3,584,027
PROCESS FOR PRODUCING ORGANO-POLYSILOXANES
Suresh B. Damle, East Brunswick, and William J. Considine, Somerset, N.J., assignors to M & T Chemicals Inc., New York, N.Y.
No Drawing. Filed May 2, 1969, Ser. No. 821,469
Int. Cl. C07f 7/02, 7/08, 7/18
U.S. Cl. 260—448.2E
8 Claims

ABSTRACT OF THE DISCLOSURE

This invention is a method of preparing organosiloxanes and organopolysiloxanes of the formula $$(R_a R'_b R''_d SiO_c)_n$$

wherein $a$ and $b$ are each selected from the group consisting of 0, 1, and 2, $c$ is selected from the group consisting of 1, 1.5 multiples thereof, $d$ is selected from the group consisting of 1, 2, and 3, and $n$ is an integer, R, R', and R'' are the same or different and are selected from the group consisting of alkyl, alkenyl, cycloalkyl, aralkyl, aryl, and alkaryl, and O is oxygen comprising reacting as reactants an organomagnesium halide R''MgX with a siloxane or a polysiloxane of the formula $$(R_a R'_b SiO_c)_n$$

wherein $a$ and $b$ are selected from the group consisting of 0, 1, 2, $c$ is selected from the group consisting of 1 and 2, $n$ is an integer and R and R' are the same or different and have the same meaning given to them above and recovering said organosiloxane or organopolysiloxane.

---

This invention relates to a method for producing siloxanes and polysiloxanes.

Siloxanes and polysiloxanes heretofore have been prepared by the hydrolysis of the corresponding halides resulting in a mixture of by-products which are difficult to separate.

It is an object of this invention to provide an efficient process for the production of siloxanes and polysiloxanes.

It is another object of this invention to provide a process for the production of siloxanes and polysiloxanes which does not also produce troublesome by-products.

It has now been discovered that siloxanes and polysiloxanes can be prepared without thhe concomitant presence of by-products by the utilization of an efficient and economical chemical process.

This invention is a method of preparing organosiloxanes and organopolysiloxanes of the formula $$(R_a R'_b R''_d SiO_c)_n$$

wherein $a$ and $b$ are each selected from the group consisting of 0, 1, 2, $c$ is selected from the group consisting of 1, 1.5 and multiples thereof, $d$ is selected from the group consisting of 1, 2, and 3, and $n$ is an integer, R, R', and R'' are the same or different and are selected from the group consisting of alkyl, alkenyl, cycloalkyl, aralkyl, aryl, and alkaryl, and O is oxygen comprising reacting as reactants an organomagnesium halide R''MgX with a siloxane or a polysiloxane of the formula $$(R_a R'_b SiO_c)_n$$

wherein $a$ and $b$ are selected from the group consisting of 0, 1, and 2, $c$ is selected from the group consisting of 1 and 2, $n$ is an integer and R and R' are the same or different and have the same meaning given to them above and recovering said organosiloxane or organopolysiloxane.

The term vinylic radical (Vi) is used herein to denote structures of the type:

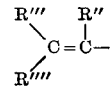

wherein R'', R''', and R'''' may be hydrogen and are further defined as is R above. The hydrocarbon radicals may be unsubstituted or carry functional groups inert to magnesium or vinylic magnesium chlorides under conditions. The vinylic radical also includes cycloalkenyls having the following general type structures:

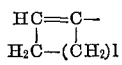

where 1 is a whole number greater than 1. By the term active hydrogen free heterocyclic radical, all heterocyclic radicals except those containing hydrogen attached to nitrogen or oxygen, or containing other groups reactive with the organic magnesium chlorides, are included.

The process of this invention is carried out by first dissolving the silicon containing reactant in an organic solvent. Organomagnesium chloride is then added to the solution, preferably with agitation. A reaction will usually start immediately; the reaction temperature will vary with the reactants and solvent utilized and the products desired and will usually be between room temperature and the reflux temperature of the reaction mixture. The reaction is usually exothermic. For special conditions, it may be necessary to carry out the reaction at low temperatures or under reduced pressures. The reaction is preferably carried out at an inert atmosphere usually nitrogen which is the least expensive. The reaction products, organosiloxanes, are substantially free of troublesome by-products.

In the preparation of the organo substituted siloxanes and organo substituted polysiloxanes separation is usually effected by hydrolyzing the reaction mixture with a dilute solution of hydrochloric acid to obtain water soluble products such as the magnesium halide in the aqueous phase and the organosiloxane or organopolysiloxane in the hydrocarbon phase. The hydrocarbon phase is then separated, dried, and the solvents separated by distillation.

The organomagnesium compounds are prepared by dissolving organo halide in an ether Q and admixing with magnesium. However, where the organo halide reactant is a gas such as vinyl chloride a suspension is made of the magnesium in the compound Q solvent and the organo halide reactant is bubbled into said suspension beneath the surface of said liquid solvent. Another method of preparing the complex comprises dissolving a small amount of the organo halide in compound Q and reacting this mixture with magnesium, thereafter slowly adding the remainder of the organo halide. Excess amounts of the compound Q, i.e. more than the theoretical 2 or 3 moles required for complexing, are usually utilized in the process. The excess acts as a solvent.

At atmospheric pressure the optimum temperature necessary to obtain the desired reaction is about 65° C., although a temperature range of 20° C. to 200° C. may be utilized. Lower temperatures require more time and higher temperatures less time to complete the reaction. The reaction mixture is preferably agitated during the course of the reaction and an inert atmosphere, e.g. nitrogen, is preferably maintained. Yields vary with the particular organo halide being reacted, but frequently approach 100%.

Using the compound Q as the reaction medium, the organic magnesium chloride complexes as formed have the formula R''MgCl·2Q wherein R'' is a hydrocarbon group substituted or unsubstituted. Where the reaction medium Q is a compound having a substituted side chain in the first or last numbered carbon atom which contains an ether linkage in the side chain, it has been found that complexes formed apparently have the formula R″MgCl·2Q The complex R″MgCl·2Q is normally liquid at room temperature.

The compound Q, as this expression is used herein for the purpose of brevity, includes cyclic ethers containing 5–6 members in the ring with at least one hydrogen atom attached to each carbon atom in the ring and having the formula

wherein X is a methylene group or a N-alkyl group; R″ is an unsubstituted saturated divalent aliphatic hydrocarbon radical; R′ is an ethylene radical, an ethylenically unsaturated divalent hydrocarbon radical, a methylene radical, or =CHR‴, (R‴ being hydrogen or an aliphatic radial); and O is oxygen. When X is N-alkyl, the ring shall contain 6 members with X and O in a position 1:4 with respect to each other.

Compounds within this definition include tetrahydrofuran, tetrahydropyran, 2 - methyltetrahydrofuran, 2-ethoxytetrahydropyran, tetrahydrofurfuryl ethyl ether, dihydropyran, and N-methylmorpholine. The compound Q may bear as substituents inert groups, i.e. groups which are not reactive with organomagnesium halides, or with any of the components and products of the reaction mixtures of the present process. Illustrative inert substituents may include substituted an unsubstituted alkyl, aryl, alkoxy, and aryloxy groups (including those bearing substituents thereon which are unreactive to other components of the reaction mixture as herein specified). Where nitrogen replaces a carbon atom in the ring at X, the nitrogen atom must be substituted with a group, such as an alkyl group, which is unreactive to the reactants or reaction products.

It is a characteristics of compound Q that the oxygen is available for electron denotation, i.e. the free π-electrons present on the oxygen are available for coordination with the Grignard reagent. Any large blocking groups on the carbon atoms adjacent to the ring oxygen may impair the availability of these electrons and the reactivity of the compound for forming a complex and assisting in the reaction. In addition to the compounds listed above as being suitable for compound Q, other equivalent compounds satisfying the requirements for this complexing agent and solvent will be apparent to those skilled in the art from inspection of the present invention. Since compound Q may also function as a solvent, a compound Q which has a high melting point may be used in practice of this invention, but if it is used as solvent, the high melting point (e.g. above 90°C) may cause difficulty in carrying out the reaction.

In the compounds $(R_aR'_bSiO_c)_n$ and R″MgX, R, R′, and R″ may be a hydrocarbon radical preferably selected from the group consisting of alkyl, alkenyl, cycloalkyl, aralkyl, aryl, alkaryl, including such radicals when inertly substituted. When R, R′, or R″ is alkyl, it may typically be straight chain or branched alkyl, including methyl, ethyl, non-propyl, isopropyl, n-butyl, isoputyl, sec-butyl, tert-butyl, n-amyl, neopentyl, isoamyl, n-hexyl, isohexyl, heptyls, octyls, decyls, dodecyls, tetradecyl, octadecyl, etc. Preferred alkyl includes lower alkyl, i.e. having less than about 8 carbon atoms, i.e. octyls and lower. When R, R′, or R″ is alkenyl, it may typically be vinyl, allyl, 1-propenyl, methallyl, buten-1-yl, buten-2-yl, buten-3-yl, penten-1-yl, hexenyl, heptenyl, octenyl, decenyl, dodecenyl, tetradecenyl, octadecyl, etc. When R, R′ or R″ is cycloalkyl, it may be typically be cyclopentyl, cyclohexyl, cycloheptyl, cyclooctyl, etc. When R, R′ or R″ is aralkyl, it may typically be benzyl, β-phenylethyl, υ-phenylpropyl, β-phenylpropyl, etc. When R, R′, or R″ is aryl, it may typically be phenyl, naphthyl, etc. When R, R′, or R″ is alkaryl, it may typically be tolyl, xylyl, p-ethylphenyl, p-nonylphenyl, etc. R, R′, or R″ may be inertly substituted, e.g. may bear a non-reactive substituent such as alkyl, aryl, cycloalkyl, aralkyl, alkaryl, alkenyl, ether, halogen, nitro, ester, etc. Typical substituted alkyls include 3-chloropropyl, 2-ethoxyethyl, carboethoxymethyl, etc. Substituted alkenyls include 4-chlorobutyl, υ-phenylpropenyl, chloroallyl, etc. Substituted cycloalkyls include 4-methylcyclohexyl, 4-chlorocyclohexyl, etc. Inertly substituted aryl includes chlorophenyl, anisyl, biphenyl, etc. Inertly substituted aralkyl includes chlorobenzyl, p-phenylbenzyl, p-methylbenzyl, etc. Inertly substituted alkaryl includes 3-choro-5-methylphenyl, 2-di-tert-butyl-4-chlorophenyl, etc. Thus the method of this invention can be practiced with a broad spectrum of siloxanes or silicone reactants.

The ultimate products of the process of this invention, silicones, are useful greases, rubbers, protective coatings, adhesives, textile finishes, lubricants, release agents, and water repellants. The products are characterized by heat stability, water repellancy, good dielectric properties and incompatibility with many organic polymers which makes them effective release agents.

The following examples are further illustrative of the present invention. It is to be understood, however, that the invention is not restricted thereto.

EXAMPLE 1

The preparation of 1,1,3,3-tetramethyl-1,3-divinyldisiloxane.—Dimethyl siloxane was prepared by hydrolyzing dimethyl dichlorosilane in a one liter 3-neck flask and equipped with a dropping funnel and reflux condenser. After the hydrolysis, the reaction mixture was complete and it was refluxed at a temperature of 100° C. for four hours, subsequently cooled and then transferred to a separatory funnel and dried over anhydrous calcium chloride. The intermediate product, dimethyl sioloxane, was a mixture of polymers containing the tetramer $(CH_3)_2CiO$ cyclic polymers, and other straight chain polymers of high molecular weights. The intermediate product, dimethyl siloxane, exhibiting a weight of 207.2 grams (3.0 moles) was placed in a five liter 3-neck flask fitted with a dropping funnel and reflux condenser containing 2500 milliliters (4.8 moles) of vinyl magnesium chloride in tetrahydrofuran and 300 milliliters of benzene. The mixture was heated to a temperature of 65° C. and agitated for 120 minutes. After six hours, substantially all of the 2000 milliliters of tetrahydrofuran had been removed. The mixture was hydrolyzed with 500 milliliters of 20% aqueous solution of hydrochloric acid. An organic layer thus formed was washed several times with water, separated. and dried over anhydrous sodium sulfate. The solvents were removed by distillation and the residue subjected to vacuum distillation. The product 1,1,3,3-tetramethyl-1,3-divinyldisiloxane exhibited a weight of 69.0 grams, a 65% yield, a boiling point 138° C.–140° C., and a refractive index of 1.4100. Vapor phase chromatographic analysis indicated that the product was 98% pure.

EXAMPLE 2

The preparation of dimethyl butyl siloxane.—a butyl magnesium chloride Grignard reagent was prepared by placing 24.32 grams (1.0 mole) of magnesium turnings in a one liter 3-neck flask fitted with a dropping funnel and reflux condenser. A mixture of 92.7 grams (1.0 mole) of butyl chloride and 500 milliliters of ethyl ether were added to the magnesium. The mixture was agitated and 5 milliliters of ethylene dibromide was added thereto to initiate the reaction, heating was maintained during the addition until a black color was observed. Upon completion of the addition, the solution was heated and refluxed for one hour and subsequently cooled. 37 grams (0.5 mole) of dimethyl siloxane in 50 milliliters of ethyl ether were added to the Grignard solution thus formed. The reaction mixture was refluxed for an additional four hours, cooled, and hydrolyzed with a 20% solution of hydrochloric acid and recovered by distillation. The product, dimethyl butyl siloxane, exhibited a weight of 31.2 grams, a boiling point of 91° C. and a refractive index of 1.4152.

EXAMPLE 3

The preparation of dimethyl vinyl siloxane.—In the preparation of dimethyl siloxane using the procedure of Example 1, 65 grams (0.87 mole of dimethyl siloxane was reacted with 500 milliliters (0.91 mole) of vinyl Grignard reagent in tetrahydrofuran. The dimethyl siloxane and tetrahydrofuran were added in a 30 minute time interval. The reaction product, dimethyl vinyl siloxane, after distillation exhibited a weight of 42 grams, boiling point range of 138° C.–145° C. and a refractive index of 1.4109.

While the invention has been described by specific embodiments, it is to be understood that it is not limited thereto, but is to be construed broadly and restricted only by the scope of the appended claims.

We claims:
1. A method of preparing organosiloxanes and organopolysiloxanes of the formula

$$(R_aR'_bR''_dSiO_c)_n$$

wherein $a$ and $b$ are each selected from the group consisting of 0, 1, and 2, $c$ is selected from the group consisting of 1, 1.5 and multiples thereof, $d$ is selected from the group consisting of 1, 2, and 3, and $n$ is an integer, R, R', and R'' are the same or different and are selected from group consisting of alkyl, alkenyl, cycoalkyl, aralykyl, aryl, and alkaryl, and 0 is oxygen comprising reacting as reactants an organomagnesium halide R''MgX with a siloxane or a polysiloxane of the formula $$(R_aR'_bSiO_c)_n$$

wherein $a$ and $b$ are selected from the group consisting of 0, 1, and 2, $c$ is selected from the group consisting of 1 and 2, $n$ is an integer and R and R' are the same or different and have the same meaning given to them above and recovering said organosiloxane or organopolysiloxane.

2. The process of claim 1 wherein said organmagnesium halide.

3. The process of claim 1 wherein said organomagnesium halide.

4. The process of claim 1 wherein said organomagnesium halide is a vinyl magnesium halide of the formula

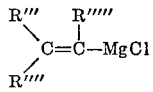

wherein R''', R'''', and R''''' are hydrogen or are defined as is R'' in claim 1.

5. A method of preparing organosiloxanes and organopolysiloxanes of the formula $$(R_aR'_bR''_dSiO_c)_n$$

wherein $a$ and $b$ are each selected from the group consisting of 0, 1, and 2, $c$ is selected from the group consisting of 1, 1.5 and multiples thereof, $d$ is selected from the group consisting of 1, 2, and 3, and $n$ is an integer, R, R', and R'' are the same or different and are selected from the group consisting of alkyl, alkenyl, cycoalkyl, aralykyl, aryl, and alkaryl, and O is oxygen which comprises preparing a Grignard reagent in the presence of a solvent ether, adding an inert hydrocarbon solvent, and adding a siloxane or polysiloxane of the formula $$(R_aR'_bSiO_c)_n$$

wherein $a$ and $b$ are selected from the group consisting of 0, 1, and 2, $c$ is selected from the group consisting of 1 and 2, $n$ is an integer and R and R' are the same or different and have the same meaning given to them above, removing said solvent ether, heating them ixture to elevated temperature, and recovering said organosiloxane or organopolysiloxane.

6. The process of claim 5 wherein said organomagnesium halide R''MgX is an alkyl magnesium halide.

7. The process of claim 5 wherein said organomagnesium halide is butyl magnesium halide.

8. The process of claim 5 wherein said organomagnesium halide is a vinyl magnesium halide of the formula

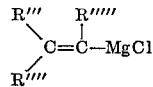

wherein R''', R'''', and R''''' are hydrogen or are defined as is R'' is claim 1.

References Cited

Eaborn, "organosilicon compounds," Academic Press, Inc., New York (1960), pp. 268–269.

TOBIAS E. LEVOW, Primary Examiner

P. F. SHAVER, Assistant Examiner

U.S. CL. X.R.

260—46.5 R

UNITED STATES PATENT OFFICE
CERTIFICATE OF CORRECTION

Patent No. 3,584,027                 Dated June 8, 1971

Inventor(s)    Suresh B. Damle et al.

It is certified that error appears in the above-identified patent and that said Letters Patent are hereby corrected as shown below:

Column 5, line 52, after "halide" insert -- R''MgX is an alkyl magnesium halide --; line 54, after "halide" insert -- is butyl magnesium halide --.

Signed and sealed this 16th day of May 1972.

(SEAL)
Attest:

EDWARD M.FLETCHER,JR.                ROBERT GOTTSCHALK
Attesting Officer                    Commissioner of Patents